(12) United States Patent
Takado et al.

(10) Patent No.: US 10,720,247 B2
(45) Date of Patent: Jul. 21, 2020

(54) NUCLEAR REACTOR POWER REGULATOR

(71) Applicant: KABUSHIKI KAISHA TOSHIBA, Minato-Ku (JP)

(72) Inventors: Naoyuki Takado, Machida (JP); Hiroshi Hosono, Koto (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 914 days.

(21) Appl. No.: 14/411,712

(22) PCT Filed: Jun. 28, 2013

(86) PCT No.: PCT/JP2013/067815
§ 371 (c)(1),
(2) Date: Dec. 29, 2014

(87) PCT Pub. No.: WO2014/003166
PCT Pub. Date: Jan. 3, 2014

(65) Prior Publication Data
US 2015/0146836 A1    May 28, 2015

(30) Foreign Application Priority Data
Jun. 29, 2012 (JP) .................... 2012-147615

(51) Int. Cl.
*G21C 7/00* (2006.01)
*G21D 3/00* (2006.01)
(Continued)

(52) U.S. Cl.
CPC ............. *G21C 7/00* (2013.01); *G21C 7/36* (2013.01); *G21D 3/001* (2013.01); *G21D 3/08* (2013.01); *Y02E 30/39* (2013.01)

(58) Field of Classification Search
CPC .......... G21C 7/36; G21C 17/108; G21C 7/00; G21Y 2004/40; G21Y 2002/201;
(Continued)

(56) References Cited

U.S. PATENT DOCUMENTS

| 5,078,953 A * | 1/1992 | Van Kuijk ............. G21C 1/084 376/210 |
| 2007/0201599 A1* | 8/2007 | Fushimi ................. G21C 1/084 376/216 |
| 2011/0200155 A1* | 8/2011 | Fushimi ................... G21C 7/36 376/217 |

FOREIGN PATENT DOCUMENTS

| JP | 61-218996 | 9/1986 |
| JP | 63-200100 | 8/1988 |

(Continued)

OTHER PUBLICATIONS

International Search Report dated Aug. 13, 2013, in PCT/JP13/067815 filed Jun. 28, 2013.

(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A nuclear reactor power regulator adjusts reactor output based on a reactor output target value and a reactor output change rate. The regulator includes a reactor output calculating device that performs computation based on a thermal equilibrium from power signals of plant parameters to calculate a reactor output signal. A correcting device corrects a continuously obtained reactor output equivalent signal that is considered to be equivalent to a reactor output at a calculation interval of the output signal, so that the output equivalent signal coincides with the output signal. The correcting device calculates a continuous corrected output (Continued)

equivalent signal. A reactor output controlling device calculates a reactor output control signal for controlling the output of the reactor, using the corrected reactor output equivalent signal, the reactor output target value, and the reactor output change rate. A reactor output controller is operated based on the reactor output control signal.

17 Claims, 9 Drawing Sheets

(51) Int. Cl.
*G21D 3/08* (2006.01)
*G21C 7/36* (2006.01)

(58) Field of Classification Search
CPC ....... G21Y 2002/207; G21Y 2004/402; G21Y 2002/205; G21Y 2004/401; G21D 3/001; G21D 3/04; G21D 3/12; G21D 3/00; G21D 3/08; G21D 3/10; G21D 3/14
USPC .......................................................... 376/241
See application file for complete search history.

(56) References Cited

FOREIGN PATENT DOCUMENTS

| JP | 1-314998 | 12/1989 |
|----|----------|---------|
| JP | 8-129098 | 5/1996 |
| JP | 2519268 | 7/1996 |
| JP | 2594976 | 3/1997 |

OTHER PUBLICATIONS

International Preliminary Report on Patentability and Written Opinion dated Dec. 31, 2014 in PCT/JP2013/067815 (English Translation only).

\* cited by examiner

NUCLEAR REACTOR POWER REGULATOR

TECHNICAL FIELD

The present invention relates to a nuclear reactor power regulator that can automatically regulate reactor power from a plant shutdown (stop) state to a rated reactor power.

BACKGROUND ART

Reactor power regulators have been developed for nuclear power plants in which thermal energy of steam generated by a reactor or a steam generator provided independently of the reactor is converted into electrical energy by a turbine and a power generator, the apparatuses being intended to regulate a reactor output (power) in a range from a plant stop state to a rated power generator output at the time of plant activation and stop or in a daily load following operation that deals with electric power load fluctuations during daytime and nighttime. Examples of the conventional reactor power regulators are illustrated in FIGS. 8 and 9.

In the conventional nuclear reactor power regulator as a first configuration example illustrated in FIG. 8, a central load dispatching center 1 or an operator 2 inputs an operation pattern (signal) 101 to an interface device 3. The interface device 3 inputs a reactor output target value (signal) 102 (which will be simply referred to as "target value 102", hereinafter) and a reactor output change rate (signal) 103 (which will be simply referred to as "change rate 103", hereinafter) to a reactor output controlling device 4 in accordance with the operation pattern 101. Instead of the operation pattern 101, the central load dispatching center 1 or the operator 2 can also input the target value 102 and the change rate 103 directly to the interface device 3.

The reactor output controlling device 4 calculates a reactor output control signal 108 (which will be simply referred to as "signal 108", hereinafter) using the target value 102, the change rate 103, and a reactor output equivalent signal 106 (which will be simply referred to as "equivalent signal 106", hereinafter). The reactor output controlling device 4 calculates the signal 108 according to, for example, the following method. The signal 108 is calculated as a signal for controlling the reactor to a reactor output set value 118 (which will be simply referred to as "set value 118", hereinafter).

(1) The set value 118 is calculated in accordance with the change rate 103, from a power generator output 106a corresponding to the reactor output equivalent signal 106 at the time of control start. The calculation is performed by a reactor output setting element 41 of the reactor output controlling device 4 until the set value 118 reaches the target value 102.

(2) After the power generator output (signal) 106a and a deviation 118a between the power generator output 106a and the set value 118 calculated by the reactor output setting element 41 are input to a controlling element 42, the controlling element 42 calculates the signal 108. The calculation is performed until a deviation between the set value (signal) 118 and the equivalent signal 106 is eliminated.

A deviation between a pressure controller output signal and the signal 108 may be used to calculate the signal 108, as needed. Here, the pressure control output signal is calculated based on a deviation between a main steam pressure signal and a main steam pressure set value (signal).

A reactor output controller 7 actuates a reactor output controlling equipment 8 by using the signal 108. For example, in a case of a boiling water reactor, a recirculation flow controlling unit included in the reactor output controller 7 outputs a reactor output controlling equipment actuation request signal 109 (which will be simply referred to as "signal 109", hereinafter) using the signal 108, to thereby change a drive state of a reactor recirculation pump 8a included in the reactor output controlling equipment 8 and thus changes a recirculation flow (flow rate).

A reactor output, a main steam flow (flow rate), and the power generator output 106a change along with the change of the recirculation flow. The signal 108 is continuously output by the reactor output controlling device 4 until the deviation between the power generator output 106a and the set value 118 is eliminated, whereby the reactor output can be regulated to the target value.

Conventionally, in a normal operation, nuclear power plants are operated so that the power generator output is a rated value (100%). The reactor output at the time of the rated power generator output is different depending on cooling water temperature for cooling a condenser of a steam turbine. In seasons in which the cooling water temperature is low, power generation efficiency is high, and hence the reactor output is set to be lower so that the rated power generator output is maintained. Meanwhile, in an operation that tends to be adopted more and more in recent years, a larger amount of electric power is output while the reactor output is maintained at a rated reactor power.

In this case, a value generally adopted as the reactor output is a reactor output signal calculated by a reactor output calculating device. The reactor output calculating device performs computation based on a thermal equilibrium from various necessary plant state quantities for each predetermined period of time. Accordingly, development of nuclear reactor power regulator that uses the following signals as the equivalent signal 106 instead of the power generator output 106a to thereby automatically perform a rated reactor power (output) constant operation has been started as described in Patent Document 1 (see FIG. 9).

That is, in the conventional nuclear reactor power regulator as a second configuration example illustrated in FIG. 9, the conventional nuclear reactor power regulator as the second configuration example uses: (A) a reactor output signal 105 (which will be simply referred to as "signal 105", hereinafter) calculated by a reactor output calculating device 5 that performs computation based on a thermal equilibrium from various necessary plant state quantities (parameters) 104; (B) a signal 206b obtained by correcting and converting an APRM signal 106b in a neutron instrumentation system of the reactor, using a conversion factor set in consideration of degradation over time of a detector and the like; and (C) a signal 206a obtained by correcting and converting the power generator output 106a using efficiency that depends on a degree of condenser vacuum and the like, as the equivalent signal 106 instead of the power generator output 106a.

Unfortunately, in a case where control is performed using a power generator output signal and the like in the conventional nuclear reactor power regulator, even if a deviation from the signal 105 occurs, it is difficult to eliminate the deviation. In consideration of above-mentioned circumstance, at present, the nuclear reactor power regulation (adjustment) from a rated power generator output to a rated reactor power and a rated reactor power constant operation are manually performed.

PRIOR ART DOCUMENT

Patent Document

Patent Document 1: Publication of (Unexamined) Japanese Patent Application No. Showa 64-218996

SUMMARY OF THE INVENTION

Problems to be Solved by the Invention

A technique of automatically performing a reactor power regulation operation at the time of activation and stop or in a daily load following operation has been developed for the conventional nuclear reactor power regulators described in Background Art. The conventional nuclear reactor power regulators that have been developed up to now are capable of automation of a reactor power regulation operation from a plant stop state to a rated power generator output, but have the following problems 1 and 2 in order to achieve an automatic increase in output up to a rated reactor power. Accordingly, automation of an output operation from the rated power generator output to the rated reactor power is difficult for the conventional apparatuses, and hence the output operation is manually performed little by little. Further, the rated reactor power is manually maintained due to the same problems as the following problems 1 and 2.

1. In the conventional nuclear reactor power regulator illustrated in FIG. 9, a calculation interval in a process calculator of the reactor output calculating device 5 is normally a several-minute interval, and hence a time delay of several minutes occurs in the signal 105. Accordingly, the apparatus cannot deal with a transient change that occurs in a time shorter than the calculation interval in the reactor output calculating device 5, and the signal 105 calculated by the reactor output calculating device 5 cannot be used for output control as it is.

2. In the conventional nuclear reactor power regulator illustrated in FIG. 9, in a case where control is performed using: the signal 206b obtained by correcting, by a conversion device 13b, the APRM signal 106b in the neutron instrumentation system of the reactor in consideration of degradation over time and the like; or the signal 206a obtained by correcting, by a conversion device 13a, the power generator output 106a using the efficiency that depends on the degree of condenser vacuum and the like, even if a deviation from the signal 105 calculated by the reactor output calculating device 5 occurs, the deviation cannot be eliminated, and the rated reactor power cannot be maintained.

Even if the signals in the problems 1 and 2 are switchingly used for the sake of controlling or maintaining a reactor output operation, the problems cannot be solved. The problems occur because the signal 105 cannot be obtained as a continuous signal in spite of the fact that the reactor output is generally defined as the signal 105 calculated by the reactor output calculating device 5.

That is, in order to solve the problems 1 and 2, it is necessary to obtain a continuous signal being equivalent to the signal 105 even if a calculation interval of the signal 105 is intermittent. If the continuous signal being equivalent to the signal 105 is obtained, automation of stable reactor power regulation from the plant shutdown (stop) state to the rated reactor power is expected to be achieved. In view of this, in order to provide a function of obtaining a continuous signal (reactor output equivalent signal) being equivalent to the signal 105 even if the calculation interval of the signal 105 is intermittent, how to configure the nuclear reactor power regulator is important.

The present invention, which has been made in view of the above-mentioned circumstances, has an object to provide a nuclear reactor power regulator having a function of obtaining a signal equivalent to a continuous reactor output signal regardless of a calculation interval of the reactor output signal, the nuclear reactor power regulator being capable of automation of stable reactor power regulation from a plant shutdown (stop) state to a rated reactor power.

Means for Solving the Problems

In order to achieve the above-mentioned object, a nuclear reactor power regulator according to an embodiment of the present invention, the nuclear reactor power regulator regulating an output of a reactor on a basis of an operation pattern or a reactor output target value and a reactor output change rate that are input by a central load dispatching center or an operator, including: a reactor output calculating device that performs computation based on a thermal equilibrium from various necessary plant state quantities to calculate a reactor output signal; a correcting device that corrects a continuously obtained reactor output equivalent signal that is considered to be equivalent to a reactor output at a calculation interval of the reactor output signal, for each calculation interval in the reactor output calculating device so that the reactor output equivalent signal coincides with the reactor output signal calculated by the reactor output calculating device, and calculates a continuous corrected reactor output equivalent signal; a reactor output controlling device that calculates at least one type of reactor output control signal for controlling the output of the reactor, using the corrected reactor output equivalent signal, the reactor output target value, and the reactor output change rate; and a reactor output controller that is actuated on a basis of the reactor output control signal.

Effects of the Invention

According to the present invention, stable reactor power regulation from a plant stop state to a rated reactor power can be automated.

DESCRIPTION OF EMBODIMENTS

Hereinafter, nuclear reactor power regulators according to embodiments of the present invention are described with reference to the drawings.

First Embodiment

Figure 1:
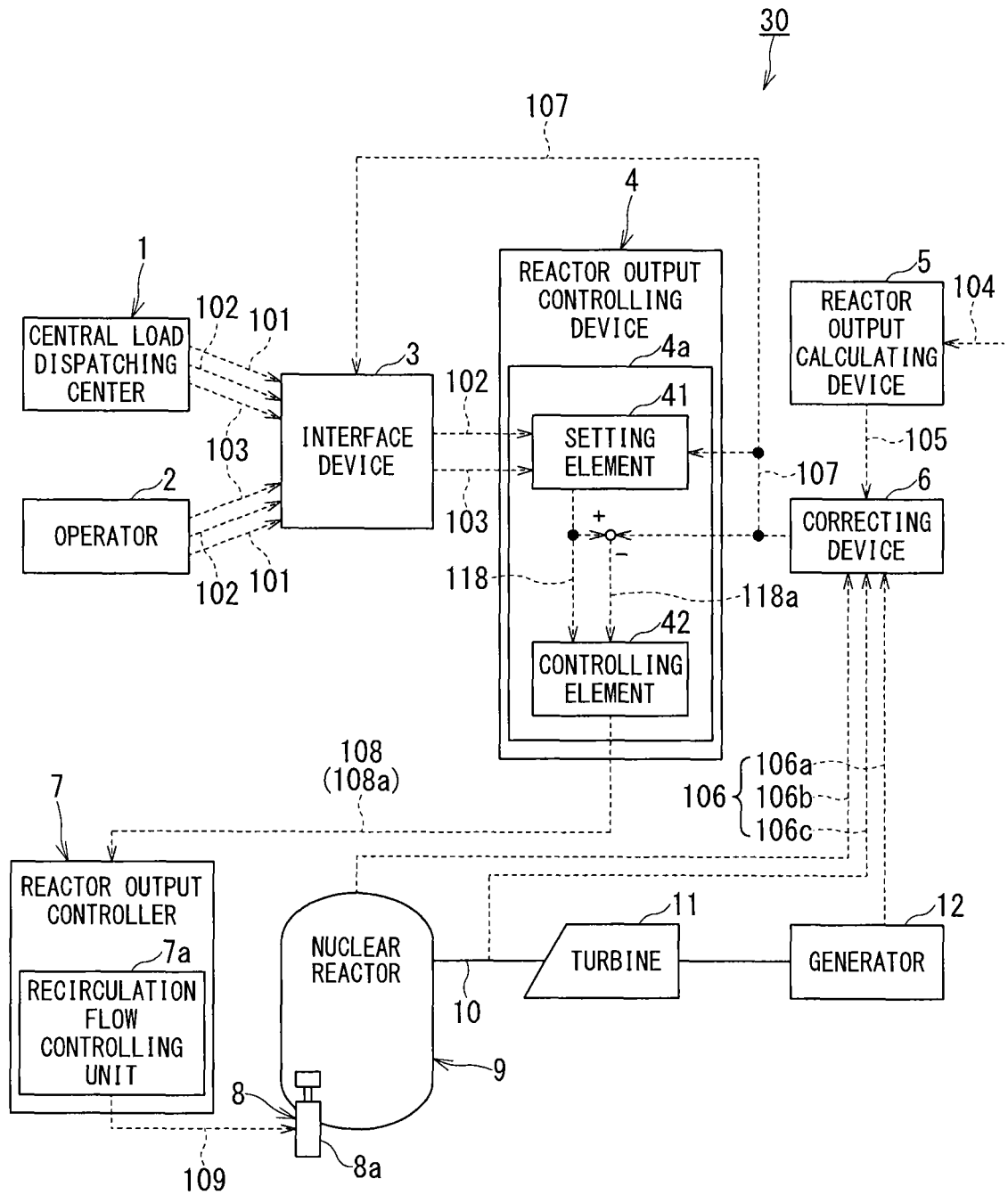
FIG. 1 is a configuration diagram illustrating a nuclear reactor power regulator according to a first embodiment of the present invention.
Figure 2:
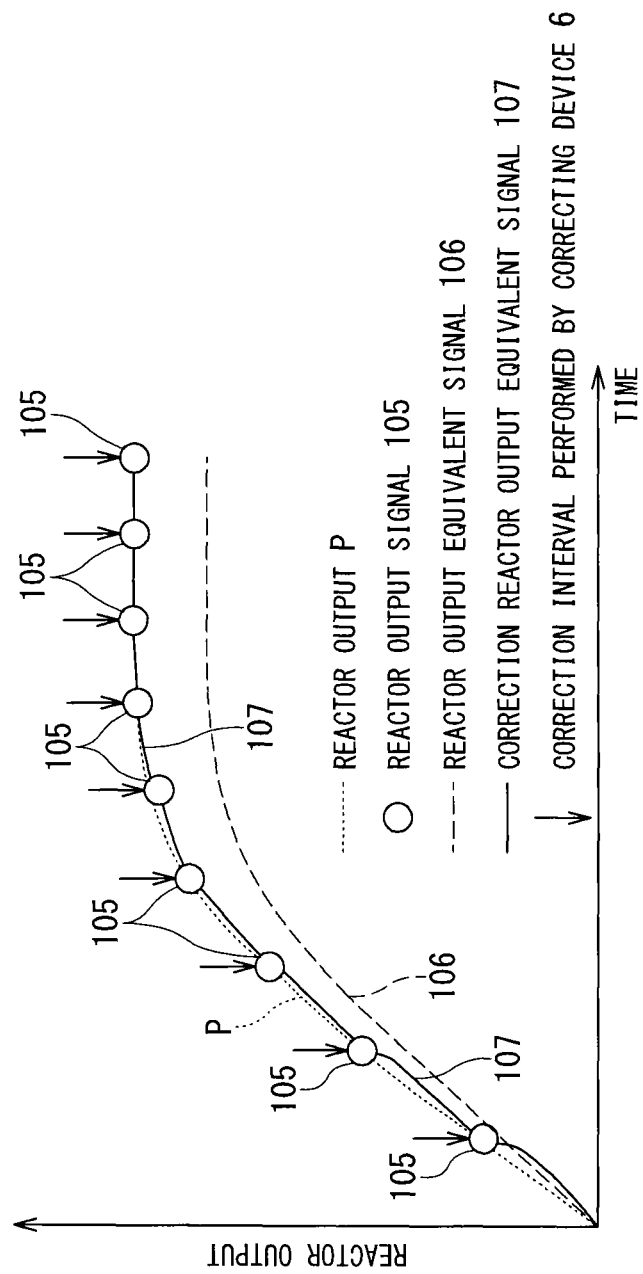
FIG. 2 is an explanatory view illustrating an example of reactor output equivalent signal with respect to time, the reactor output equivalent signal being applied to the nuclear reactor power regulator according to the first embodiment of the present invention.
Figure 3:
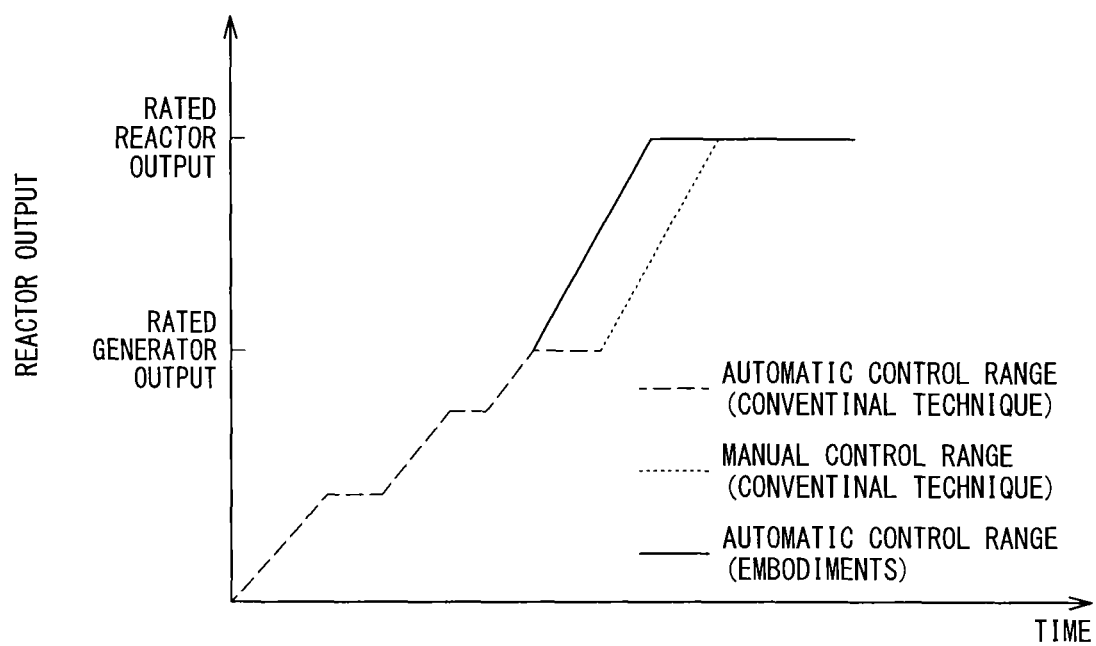
FIG. 3 is an explanatory view illustrating an example of an activation curve that is applied to the nuclear reactor power regulator according to the present invention.

Corresponding to FIGS. 1-3

FIG. 1 is a configuration diagram illustrating a nuclear reactor power regulator 30 that is an example nuclear reactor power regulator according to a first embodiment of the present invention.

The nuclear reactor power regulator 30 includes: an interface device 3 that outputs a reactor output target value (signal) 102 (which will be simply referred to as "target value 102", hereinafter) and a reactor output change rate (signal) 103 (which will be simply referred to as "change rate 103", hereinafter) using an operation pattern (signal) 101 or the target value 102 and the change rate 103 that are input by a central load dispatching center 1 or an operator 2; a reactor output controlling device 4 that outputs a reactor output control signal 108 (which will be simply referred to as "signal 108", hereinafter) using the target value 102, the change rate 103, and a corrected reactor output equivalent signal 107 (which will be simply referred to as "corrected equivalent signal 107", hereinafter); a reactor output controller 7 that calculates a reactor output controlling equipment actuation request signal 109 (which will be simply referred to as "signal 109", hereinafter) using the signal 108; a reactor output calculating device 5 that performs computation based on a thermal equilibrium from various necessary plant state quantities (signals) 104 to calculate a signal 105; and a correcting device 6 that outputs the corrected equivalent signal 107 to the reactor output controlling device 4 and the interface device 3, the corrected equivalent signal 107 being calculated by correcting a reactor output equivalent signal 106 (which will be simply referred to as "equivalent signal 106", hereinafter) that is continuously obtained and considered to be equivalent to a reactor output at a calculation interval of the reactor output, using the calculated signal 105.

The reactor output controlling device 4 includes a first reactor output controlling unit 4a including a reactor output setting element 41 and a controlling element 42. The reactor output controlling device 4 (first reactor output controlling unit 4a) calculates the signal 108 according to, for example, the following method. The signal 108 is calculated as a signal for controlling the reactor to a reactor output set value 118 (which will be simply referred to as "set value 118", hereinafter).

(1) The set value (signal) 118 is calculated in accordance with the change rate 103, from the corrected equivalent signal 107 at the time of control start. The calculation is performed by the reactor output setting element 41 of the reactor output controlling device 4 until the set value 118 reaches the target value 102.

(2) The corrected equivalent signal 107 and a deviation 118a between the corrected equivalent signal 107 and the set value 118 are input to the controlling element 42 of the reactor output controlling device 4, and the signal 108 is calculated. This calculation is performed until the deviation between the set value 118 and the corrected equivalent signal 107 is eliminated.

A deviation between a pressure controller output signal and the signal 108 may be used to calculate the signal 108, as needed. The pressure controller output signal is calculated from a deviation between a main steam pressure signal and a main steam pressure set value. Here, a signal selected as the equivalent signal 106 may be a continuously obtained signal correlated with the reactor output at the calculation interval in the reactor output calculating device 5. Examples of the continuously obtained signal correlated with the reactor output at the calculation interval in the reactor output calculating device 5 include a total flow detection signal 106c, an in-reactor neutron flux signal 106b, a power generator output signal 106a, and so on.

The reactor output controller 7 actuates a reactor output controlling equipment 8 by using the signal 108. For example, in a case of a boiling water reactor, a recirculation flow controlling unit 7a serving as the reactor output controller 7 outputs the signal 109 using the signal 108, to thereby change a drive state of a reactor recirculation pump 8a serving as the reactor output controlling equipment 8 and thus change a recirculation flow (flow rate).

If the recirculation flow is changed, the reactor output and a main steam flow (flow rate) and a power generator output corresponding to the signals 106 change along with the change of the recirculation flow. The signal 108 is continuously output by the reactor output controlling device 4 until the deviation between the set value 118 and the corrected equivalent signal 107 calculated using the signals 106 is eliminated, whereby the reactor output can be regulated to the target value.

Incidentally, although the nuclear reactor power regulator 30 illustrated in FIG. 1 includes the recirculation flow controlling unit 7a as the reactor output controller 7, another reactor output controller may be used as the reactor output controller 7. An example of the reactor output controller may be used as the reactor output controller 7 includes a control rod position controlling unit instead of the recirculation flow controlling unit 7a, the reactor output controlling unit regulating the reactor output by controlling a position of a control rod.

In the nuclear reactor power regulator 30 illustrated in FIG. 1, the interface device 3, the reactor output controlling device 4, the reactor output calculating device 5, the correcting device 6, the reactor output controller 7, and the reactor output controlling equipment 8 included in the nuclear reactor power regulator 30 are each configured in a simplex manner. As another example of the nuclear reactor power regulator 30, alternatively, at least any of the interface device 3, the reactor output controlling device 4, the reactor output calculating device 5, the correcting device 6, the reactor output controller 7, and the reactor output controlling equipment 8 is configured in a multiplex manner. In this example of the nuclear reactor power regulator 30 as well as the nuclear reactor power regulator 30 illustrated in FIG. 1 can adjust the reactor output.

The following correction methods are given as a calculation example of the corrected equivalent signal 107 by the correcting device 6.

<Correction Method 1> A method of multiplying the equivalent signal 106 by correction gain G1 corrected equivalent signal 107=correction gain G1×equivalent signal 106     (S1)

The correction gain G1 serves to adjust so that the corrected equivalent signal 107 and the signal 105 are coincided with each other for each calculation interval in the reactor output calculating device 5.

correction gain $G1$=signal 105/equivalent signal 106 (S2)

<Correction Method 2> A method of adding the signal 105 to a product obtained by multiplying a difference between the equivalent signal 106 and the signal 105 by gain.

corrected equivalent signal 107=signal 105+$F_G$(equivalent signal 106)×(equivalent signal 106−signal 105) (S3)

In the formula (S3), $F_G(X)$ represents a function for giving gain corresponding to a value of X, the function being set in advance so that the corrected equivalent signal 107 and the signal 105 coincide with each other. The signal 105 is updated for each calculation interval in the reactor output calculating device 5.

<Correction Method 3> A method of multiplying a function for converting so that the equivalent signal 106 coincides with the signal 105, by correction gain G2 corrected equivalent signal 107=correction gain $G2 \times F_S$(equivalent signal 106) (S4)

In the formula (S4), $F_S(X)$ is a function that is set in advance so that the corrected equivalent signal 107 and the signal 105 coincide with each other. In order to correct a deviation between a preset value and an actually measured value, the correction gain G2 is adjusted (regulated) in the following manner for each calculation interval in the reactor output calculating device 5.

correction gain $G2$=signal 105/$F_S$(equivalent signal 106) (S5)

<Correction Method 4> A method of adding correction bias B to a function for converting so that the equivalent signal 106 coincides with the signal 105 corrected equivalent signal 107=$F_S$(equivalent signal 106)+$B$ (S6)

In the formula (S6), $F_S(X)$ is a function that is set in advance so that the corrected equivalent signal 107 and the signal 105 coincide with each other. In order to correct a deviation between a preset value and an actually measured value, the correction bias B is adjusted in the following manner for each calculation interval in the reactor output calculating device 5.

correction bias $B$=signal 105−$F_S$(equivalent signal 106) (S7)

No matter which of the correction methods 1 to 4 is used, the correcting device 6 can make such correction that the equivalent signal 106 coincides with the signal 105, for each calculation interval in the reactor output calculating device 5, whereby the deviation from the signal 105 can be suppressed within a predetermined range. Further, the correcting device 6 can calculate a signal (corrected equivalent signal 107) equivalent to a continuous reactor output signal that is considered to be equivalent to the reactor output at the calculation interval of the reactor output signal.

Therefore, in the nuclear reactor power regulator 30, even if the calculation interval of the reactor output signal is intermittent, the corrected equivalent signal 107 can be obtained regardless of the calculation interval of the reactor output signal. The corrected equivalent signal 107 is a signal being equivalent to a continuous reactor output signal that is considered to be equivalent to the reactor output at the calculation interval, of which deviation from the signal 105 is suppressed within a predetermined range. The nuclear reactor power regulator 30 can obtain the corrected equivalent signal 107, and therefore suppress occurrence of the deviation between the corrected equivalent signal 107 and the signal 105.

If the corrected equivalent signal 107 is output to the interface device 3, the corrected equivalent signal 107 can be monitored on a display element of the interface device 3. As a result, the operator 2 can always monitor a value of the corrected equivalent signal 107 through the interface device 3.

There is an example of the corrected reactor output equivalent signal 107 obtained by the nuclear reactor power regulator 30 in FIG. 2. As illustrated in FIG. 2, since the signal 105 calculated by the reactor output calculating device 5 is an intermittent signal, the signal 105 cannot be used as the reactor output control signal as it is. Further, even if a deviation from a reactor output P occurs in the equivalent signal 106, the deviation cannot be immediately resolved, and hence the equivalent signal 106 cannot adjust the reactor output to the target reactor output P.

Meanwhile, in the nuclear reactor power regulator 30, the corrected equivalent signal 107 equivalent to the continuous signal 105 can be obtained. Although a deviation may occur in the corrected equivalent signal 107 if the change rate 103 is high, the deviation of the corrected equivalent signal 107 can be suppressed to be smaller than that of the equivalent signal 106. In the nuclear reactor power regulator 30, the signal 108 is continuously output until the deviation between the corrected equivalent signal 107 and the target value 102 or the set value 118 becomes zero, and reactor output control is performed, whereby reactor power regulation up to a rated reactor power, which has been conventionally manually performed, can be automatically performed.

There is an example activation curve of the nuclear reactor power regulator 30 in FIG. 3. The nuclear reactor power regulator 30 of the present embodiment is capable of the automatic control up to the rated reactor power, and can thereby make it unnecessary that the operator 2 performs mode switching (switching from an automatic mode to a manual mode) in reactor power regulation at a rated power generator output, which has been conventionally necessary. Accordingly, the reactor power regulation is possible in a shorter time with a reduced burden on the operator 2 in a state where the reactor power regulation up to the rated reactor power is automated.

Second Embodiment

Figure 4:
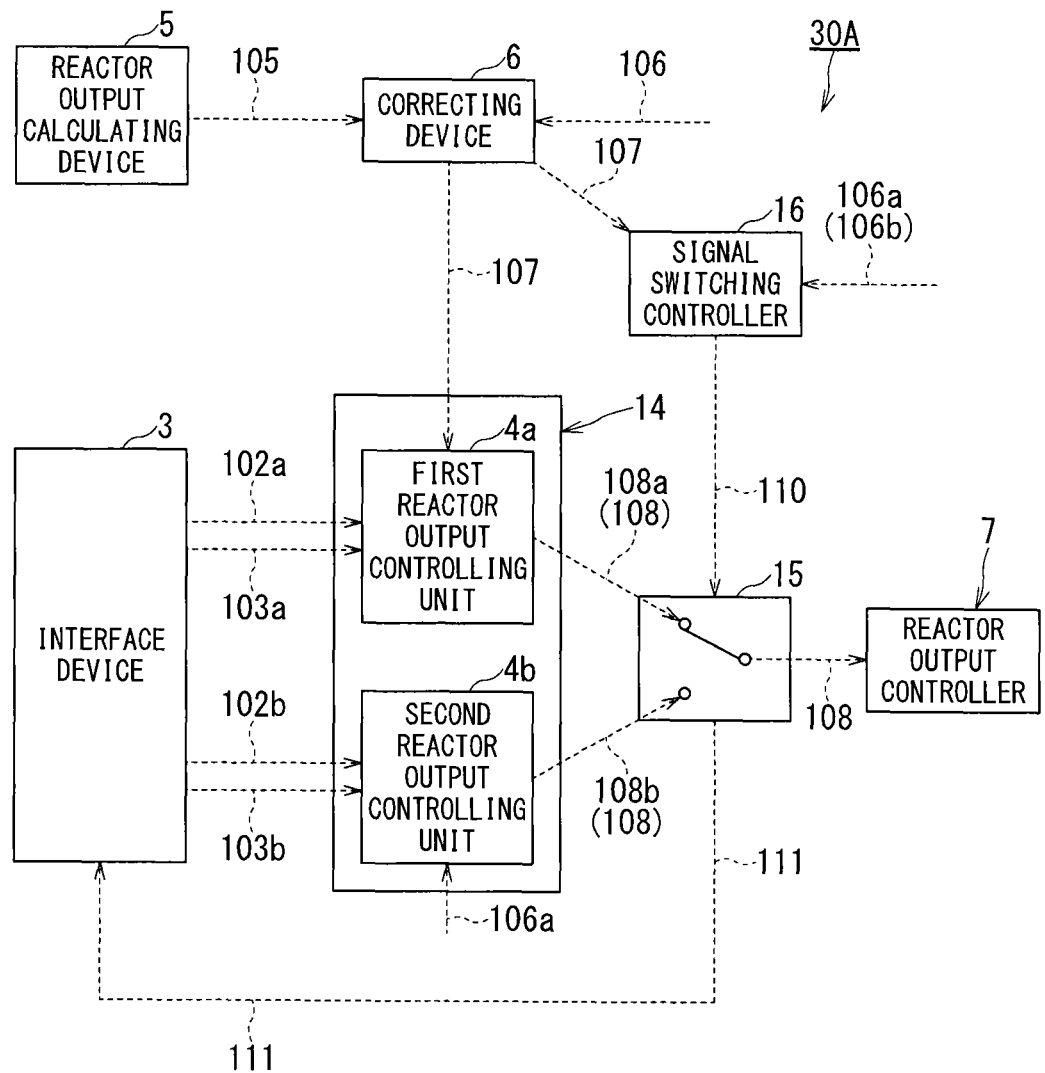
FIG. 4 is a configuration diagram illustrating an apparatus according to a second embodiment of the present invention.

Corresponding to FIG. 4

FIG. 4 is a configuration diagram illustrating a nuclear reactor power regulator 30A that is an example nuclear reactor power regulator according to a second embodiment of the present invention. In describing the nuclear reactor power regulator 30A, the same configurations as those in the nuclear reactor power regulator 30 illustrated in FIG. 1 are denoted by the same reference numerals or characters, and redundant description thereof is omitted. Illustration of a system of the reactor power generating plant is also omitted in drawings (FIGS. 4 to 7) referred to in the second and subsequent embodiments.

The nuclear reactor power regulator 30A is basically different from the nuclear reactor power regulator 30 described in the first embodiment, for example, in that the nuclear reactor power regulator 30A further includes a reactor output controlling device 14 (reactor output controlling units 4a, 4b), and a reactor output control signal switching device 15. The reactor output controlling device 14 calculates a plurality of (for example, two) types of reactor output control signals. The reactor output control signal switching device 15 selects (makes switching to) one reactor output control signal to be given as the signal 108 to the reactor output controller 7, from among the plurality of types of reactor output control signals calculated by the reactor output controlling device 14.

In FIG. 4, the first reactor output controlling unit 4a has a configuration being equivalent to that of the reactor output controlling device 4 described in the first embodiment, and calculates the signal 108 (more specifically, a first signal 108a) similarly to the reactor output controlling device 4 (reactor output controlling unit 4a). The second reactor output controlling unit 4b calculates the signal 108 (more specifically, a second signal 108b) using: a power generator output target value 102b that is input by the interface device 3 and is a kind of reactor output target value; a power generator output change rate 103b that is similarly input by the interface device 3 and is a kind of change rate 103; and a power generator output 106a that is one of the signals 106.

The switching device 15 receives the calculated first and second signals 108a, 108b, and switches a signal to be output as the reactor output control signal to the reactor output controller 7, between the first signal 108a and the second signal 108b, whereby any one of the first signal 108a and the second signal 108b is input as the signal 108 from the switching device 15 to the reactor output controller 7.

Because the switching device 15 is further included in the nuclear reactor power regulator 30A, the reactor output can be controlled in the following manner. That is, up to a given reactor output P (for example, a rated power generator output), which is a region proven by prior arts, the reactor output can be controlled using the second signal 108b that is calculated by the second reactor output controlling unit 4b using the power generator output target value 102b, the power generator output change rate 103b, and the power generator output 106a. Further, in a region beyond the rated power generator output, the reactor output can be controlled using the first signal 108a that is calculated by the first reactor output controlling unit 4a using the target value 102a, the change rate 103a, and the corrected equivalent signal 107.

In the proven region up to the rated power generator output, the control is performed using the second signal 108b calculated using the power generator output 106a, whereby the reactor output (power) P can be regulated more stably than in the first embodiment (nuclear reactor power regulator 30).

If the nuclear reactor power regulator 30A further includes a signal switching controller 16, the switching device 15 can be automatically actuated. For example, the corrected equivalent signal 107 or the power generator output 106a is input to the signal switching controller 16. Then, in a case where the reactor output P or the power generator output is equal to or more than a given value, a reactor output control signal switching request signal 110 is output to the switching device 15, whereby the switching device 15 is switched to the reactor output control using the first signal 108a (first reactor output control mode).

Meanwhile, in a case where the reactor output or the power generator output is equal to or less than the given value, the signal switching controller 16 switches the switching device 15 to the reactor output control using the second signal 108b (second reactor output control mode).

The nuclear reactor power regulator 30A further includes the signal switching controller 16, and can therefore omit a switching operation by the operator. As a result of omitting a switching operation by the operator, a human error such as forgetting to switch can be prevented from occurring in addition to that the automatic reactor power regulation up to the rated reactor power can be performed in a shorter time.

A reactor output control signal switching signal 111 (which will be simply referred to as "switching signal 111", hereinafter) is output from the switching device 15 to the interface device 3, whereby which signal 108 (in the above-mentioned example, the first signal 108a or the second signal 108b) is used by the reactor output controller 7 to perform the reactor output control is reported to the operator 2. Accordingly, the operator 2 can always monitor which signal is used to perform the reactor output control, by monitoring the display (monitor) of the interface device 3.

Third Embodiment

Figure 5:
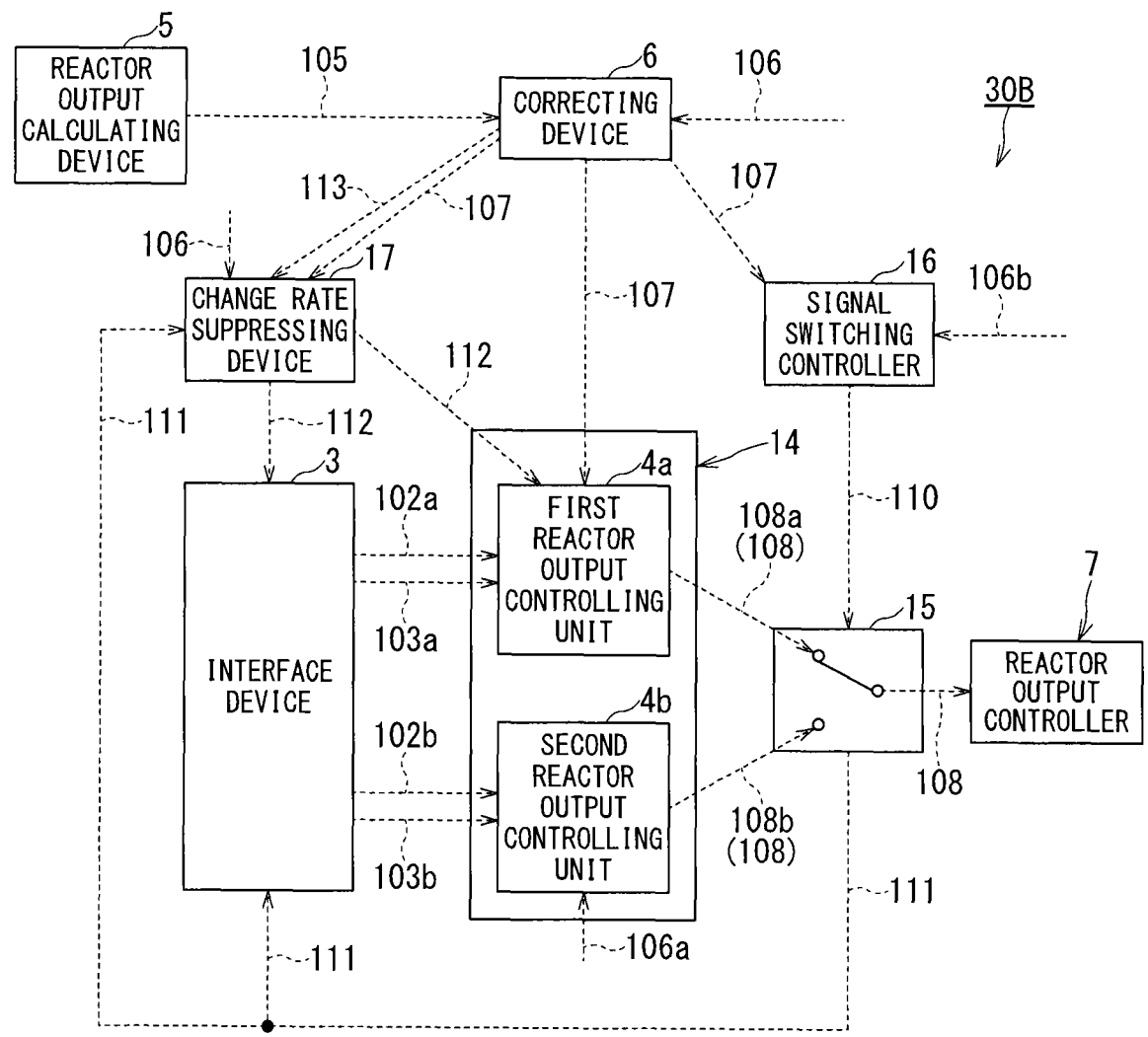
FIG. 5 is a configuration diagram illustrating an apparatus according to a third embodiment of the present invention.

Corresponding to FIG. 5

FIG. 5 is a configuration diagram illustrating a nuclear reactor power regulator 30B that is an example nuclear reactor power regulator according to a third embodiment of the present invention.

In describing the nuclear reactor power regulator 30B, the same configurations as those in the nuclear reactor power regulator 30A illustrated in FIG. 4 are denoted by the same reference numerals or characters, and redundant description thereof is omitted. The nuclear reactor power regulator 30B is basically different from the nuclear reactor power regulator 30A described in the second embodiment in that the nuclear reactor power regulator 30B further includes a reactor output change rate suppressing device 17 that suppresses the change rate 103a.

In a case where the reactor output controlling device 14 (more specifically, the first reactor output controlling unit 4a) performs the reactor output control using the corrected equivalent signal 107 received from the correcting device 6, the reactor output change rate suppressing device 17 outputs a reactor output change rate suppression signal 112 (which will be simply referred to as "signal 112", hereinafter) to the interface device 3 or the first reactor output controlling unit 4a, and thereby suppresses the reactor output change rate (signal) 103a.

Because the nuclear reactor power regulator 30B further includes the reactor output change rate suppressing device 17, for example, in a case where the reactor output change rate (signal) 103a is excessively high and where an influence on the control, of a deviation between the corrected equivalent signal 107 and the signal 105 calculated by the reactor output calculating device 5 exceeds an ignorable level (cannot be ignored), the influence of the deviation can be minimized by suppressing the change rate 103a to a predetermined value or lower.

For example, if the change rate 103a is suppressed to a control accuracy or lower of the nuclear reactor power regulator 30B at the calculation interval in the reactor output calculating device 5, the deviation between the corrected equivalent signal 107 and the signal 105 calculated by the reactor output calculating device 5 can be reliably suppressed to the control accuracy or lower. Accordingly, the nuclear reactor power regulator 30B can suppress the influence on the control, of the deviation between the corrected equivalent signal 107 and the signal 105 that can occur in a region in which the change rate 103a is high, whereby the reactor output can be regulated still more stably than in the nuclear reactor power regulator 30A.

A method for on/off switching of the function of suppressing the change rate 103a by the reactor output change rate suppressing device 17 includes: a method in which the on/off switching is manually made by the operator; and a method in which, when the first reactor output controlling unit 4a performs the reactor output control using the corrected equivalent signal 107 as described above, the switching signal 111 is input from the switching device 15 to the reactor output change rate suppressing device 17, and the on/off switching is automated in accordance with a signal state of the switching signal 111.

The nuclear reactor power regulator 30B has a function of automatically suppressing the change rate 103 (103a). In the nuclear reactor power regulator 30B, in a case where the reactor output controlling device 14 performs the reactor output control 108 using the corrected equivalent signal 107 corrected by the correcting device 6, the change rate suppressing device 17 that receives the corrected equivalent signal 107 generates the signal 112 on the basis of the corrected equivalent signal 107, and outputs the signal 112 to the interface device 3 or the first reactor output controlling unit 4a, whereby the function of automatically suppressing the change rate 103 (103a) is achieved.

In another method, the corrected equivalent signal 107 or the equivalent signal 106 (106a, 106b) is input to the reactor output change rate suppressing device 17. Then, in a case where the reactor output or the power generator output is equal to or less than a given value, the signal 112 is output to the interface device 3 or the reactor output controlling device 14 (4), whereby the change rate 103a is suppressed.

In still another method, a corrected reactor output equivalent signal before-after-correction deviation signal 113 (which will be simply referred to as "deviation signal 113", hereinafter) indicating a deviation between values before and after the correction of the corrected equivalent signal 107 by the correcting device 6 is input to the reactor output change rate suppressing device 17. Then, in a case where the deviation is equal to or more than a given value, the signal 112 is output to the interface device 3 or the reactor output controlling device 14 (4), whereby the change rate 103a is suppressed.

In still another method, the corrected equivalent signal 107 or the power generator output 106a is input to the reactor output change rate suppressing device 17. Then, in a case where the reactor output or the power generator output is equal to or more than a given value, the signal 112 is output to the interface device 3 or the reactor output controlling device 14 (4), whereby the change rate 103a is suppressed.

In still another method, the deviation signal 113 indicating the deviation between the values before and after the correction of the corrected equivalent signal 107 by the correcting device 6 is input to the reactor output change rate suppressing device 17. Then, in a case where the deviation is equal to or more than a given value, while the signal 112 for switching on the reactor output suppression is output to the interface device 3 or the reactor output controlling device 14 (4), the deviation signal 113 indicating the deviation between the values before and after the correction of the corrected equivalent signal 107 by the correcting device 6 is input to the reactor output change rate suppressing device 17. Then, if the deviation is less than the given value, the signal 112 for switching off the reactor output suppression is output to the interface device 3 or the reactor output controlling device 14 (4). If this method is used, as is the case with using other above-described method, the change rate 103a can be suppressed.

As a result, the nuclear reactor power regulator 30B enables a user to prevent from forgetting to suppress the change rate 103a due to a human error. In addition, since the nuclear reactor power regulator 30B can further minimize the influence on the control, the influence occurring the deviation between the corrected equivalent signal 107 and the signal 105 calculated by the reactor output calculating device 5, the nuclear reactor power regulator 30B can still more stably adjust the reactor output.

Because the signal 112 is output from the reactor output change rate suppressing device 17 to the interface device 3, whether or not the change rate 103a is suppressed is reported to the operator 2. Accordingly, in the nuclear reactor power regulator 30B, the operator 2 can always monitor for what reason the change rate 103a is suppressed, on the display (monitor) of the interface device 3.

In the description of the present embodiment, although the nuclear reactor power regulator 30B (FIG. 5) further including the reactor output change rate suppressing device 17 in addition to the configuration of the nuclear reactor power regulator 30A is given as an example of the nuclear reactor power regulator according to the third embodiment of the present invention, the nuclear reactor power regulator according to the third embodiment of the present invention is not limited thereto. The nuclear reactor power regulator according to the third embodiment of the present invention may further include the reactor output change rate suppressing device 17 in addition to the configuration of the nuclear reactor power regulator 30.

Fourth Embodiment

Figure 6:
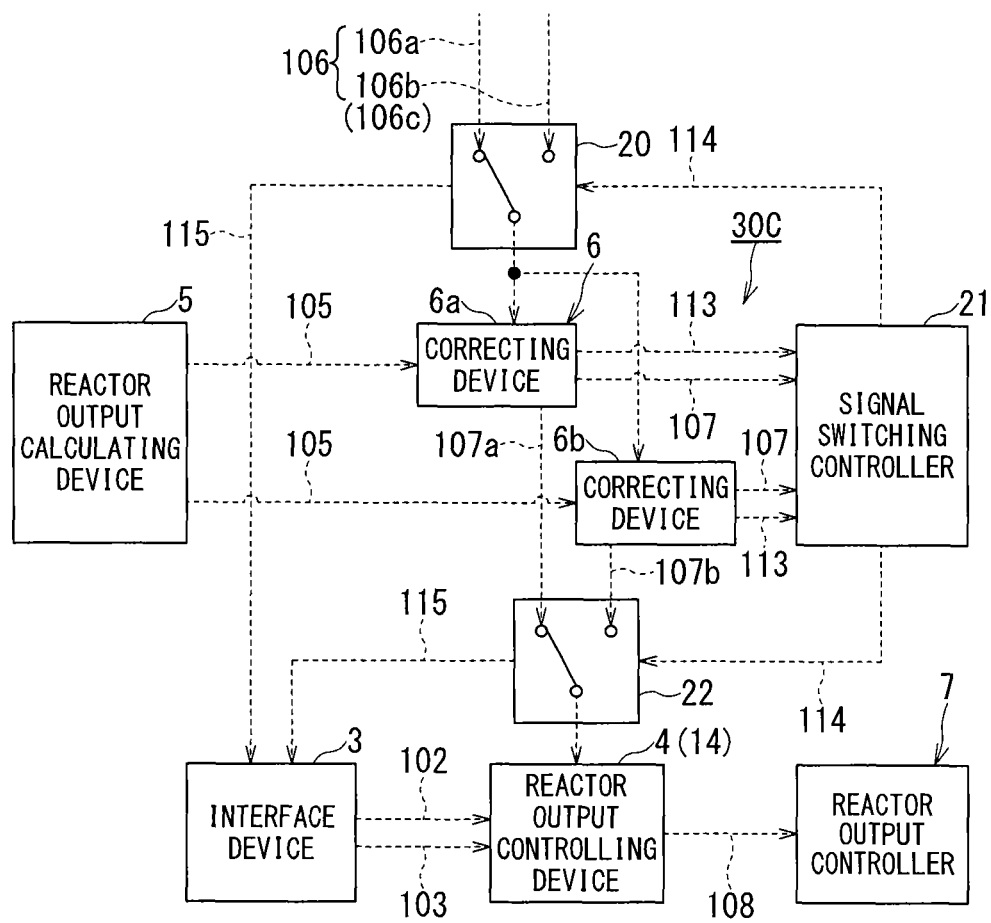
FIG. 6 is a configuration diagram illustrating an apparatus according to a fourth embodiment of the present invention.

Corresponding to FIG. 6

FIG. 6 is a configuration diagram illustrating a nuclear reactor power regulator 30C that is an example nuclear reactor power regulator according to a fourth embodiment of the present invention.

In describing the nuclear reactor power regulator 30C, the same configurations as those in the apparatuses 30, 30A described in the first and second embodiments are denoted by the same reference numerals or characters, and redundant description thereof is omitted.

The nuclear reactor power regulator 30C is basically different in configuration from the nuclear reactor power regulator 30 in that the nuclear reactor power regulator 30C is additionally provided with at least one of: a reactor output equivalent signal switching device 20 that makes switching to (selects) one equivalent signal 106 to be input to the correcting device 6 (6a, 6b), from among the plurality of input signals 106 {106a, 106b (106c)}; and a corrected reactor output equivalent signal switching device 22 that makes switching to (selects) one signal 107 to be input to the reactor output controlling device 4 (14), from among the plurality of signals 107 (107a, 107b) output from the correcting device 6 (6a, 6b).

Incidentally, in the example illustrated in FIG. 6, the nuclear reactor power regulator 30C includes both the switching device 20 and the switching device 22.

The switching device 20 switches the equivalent signal 106, for example, from the power generator output signal 106a to the in-reactor neutron flux signal 106b or the total flow detection signal 106c. This method can be used in a case where the correction method of the correcting device 6 does not depend on the type of the equivalent signal 106, as in the calculation of the corrected equivalent signal 107 according to the correction method 1 described in the first embodiment.

The following advantages can be achieved by additionally providing the switching device 20.

1. In a case where a region in which a correlation with the reactor output is favorable is different among several signals 106 (106a, 106b, 106c) depending on the reactor output and a state of the reactor, the equivalent signal 106 is switched so as to suit each region, whereby an optimal reactor output equivalent signal can be used.

2. Even if one of the equivalent signals 106 cannot be obtained, the reactor output control can be continued using another equivalent signal 106.

The above-mentioned advantages can be similarly obtained by additionally providing the switching device 22 instead of the switching device 20. In a case where the switching device 22 is additionally provided, the correcting device 6 (6a, 6b) needs to be provided for each used equivalent signal 106. In this case, although a configuration of the correcting device 6 (6a, 6b) is more complicated than that in a case where only the switching device 20 is provided, the plurality of signals 107 (107a, 107b) can always be prepared, and hence an influence of the deviation between the corrected equivalent signal 107 and the signal 105 calculated by the reactor output calculating device 5 before and after the signal switching can be reduced.

Accordingly, in the case where the switching device 22 is additionally provided, the reactor output can be regulated more stably than in a case where the switching device 22 is not provided. This nuclear reactor power regulating method can be used independently of the correction method of the correcting device 6, and each reactor output equivalent signal can be corrected according to a correction method best suited to each signal, so that the corrected equivalent signal 107 can be calculated.

In the nuclear reactor power regulator 30C, the type of the signal to be output from at least one of the switching device 20 and the switching device 22 can be manually switched by the operator 2. In addition, if a signal switching controller 21 is additionally provided, the type of the signal to be output therefrom can also be automatically switched on the basis of a reactor output equivalent signal/corrected reactor output equivalent signal switching request signal 114 (which will be simply referred to as "switching request signal 114", hereinafter). The signal switching controller 21 generates and outputs the switching request signal 114 for requesting which of the reactor output equivalent signal and the corrected reactor output equivalent signal should be selected.

For example, the corrected equivalent signal 107 or the power generator output 106a is input to the signal switching controller 21. Then, if the reactor output or the power generator output becomes equal to or more than a given value, the signal switching controller 21 outputs the switching request signal 114 to the switching device 20 or the switching device 22, whereby the signal to be output is switched. Alternatively, the deviation signal 113 indicating the deviation between the values before and after the correction of the corrected equivalent signal 107 by the correcting device 6 is input to the signal switching controller 21. Then, if the deviation becomes equal to or more than a given value, the signal to be output is switched in a similar manner as the case where the reactor output or the power generator output is equal to or more than a given value.

As a result, the nuclear reactor power regulator 30C enables a user to prevent from forgetting to switch the signal due to a human error. In addition, since the nuclear reactor power regulator 30C can further minimize occurrence of the deviation between the corrected equivalent signal 107 and the signal 105, the nuclear reactor power regulator 30C can still more stably adjust the reactor output.

When the switching device 20 or the switching device 22 makes signal switching, the switching device 20 or the switching device 22 outputs reactor output equivalent signal/corrected reactor output equivalent signal switching signal 115 indicating that which equivalent signal 106 (or which corrected equivalent signal 107) is currently selected (output) to the interface device 3, whereby the interface device 3 informs the operator 2 that which equivalent signal 106 (or which corrected equivalent signal 107) is currently used for the control. Accordingly, the operator 2 can always monitor which signal is used to perform the reactor output control, on the display (monitor) of the interface device 3.

Fifth Embodiment

Figure 7:
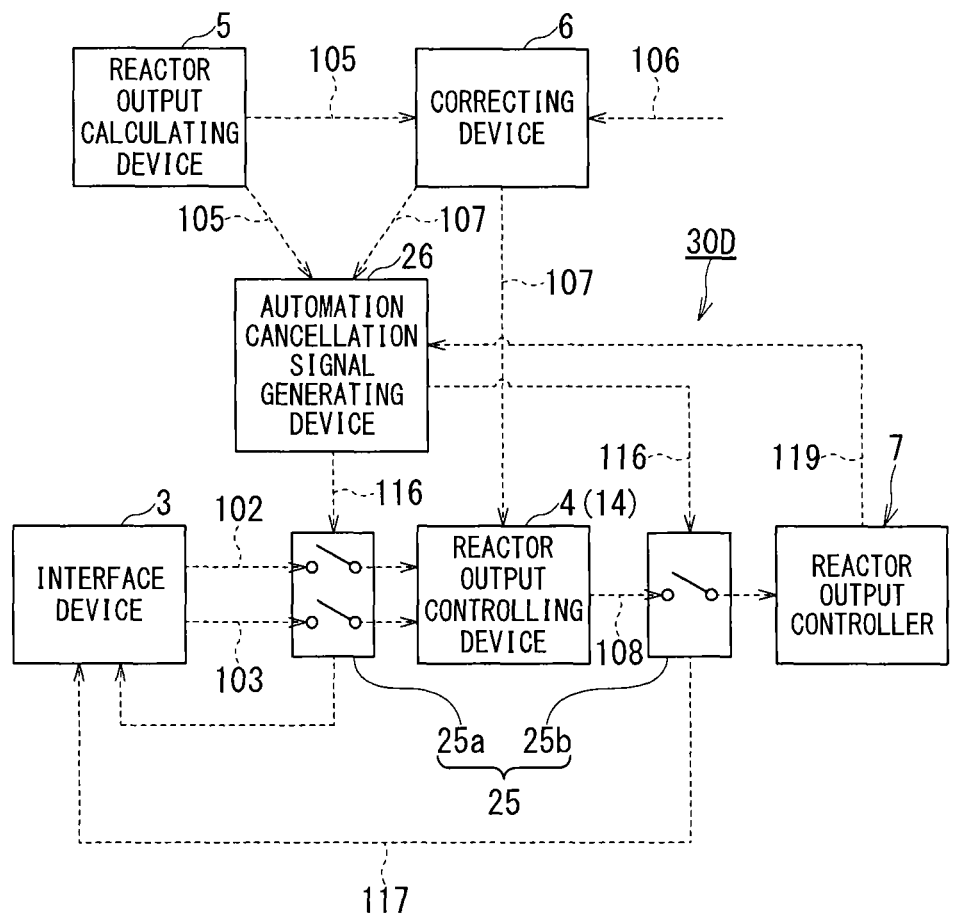
FIG. 7 is a configuration diagram illustrating an apparatus according to a fifth embodiment of the present invention.
Figure 8:
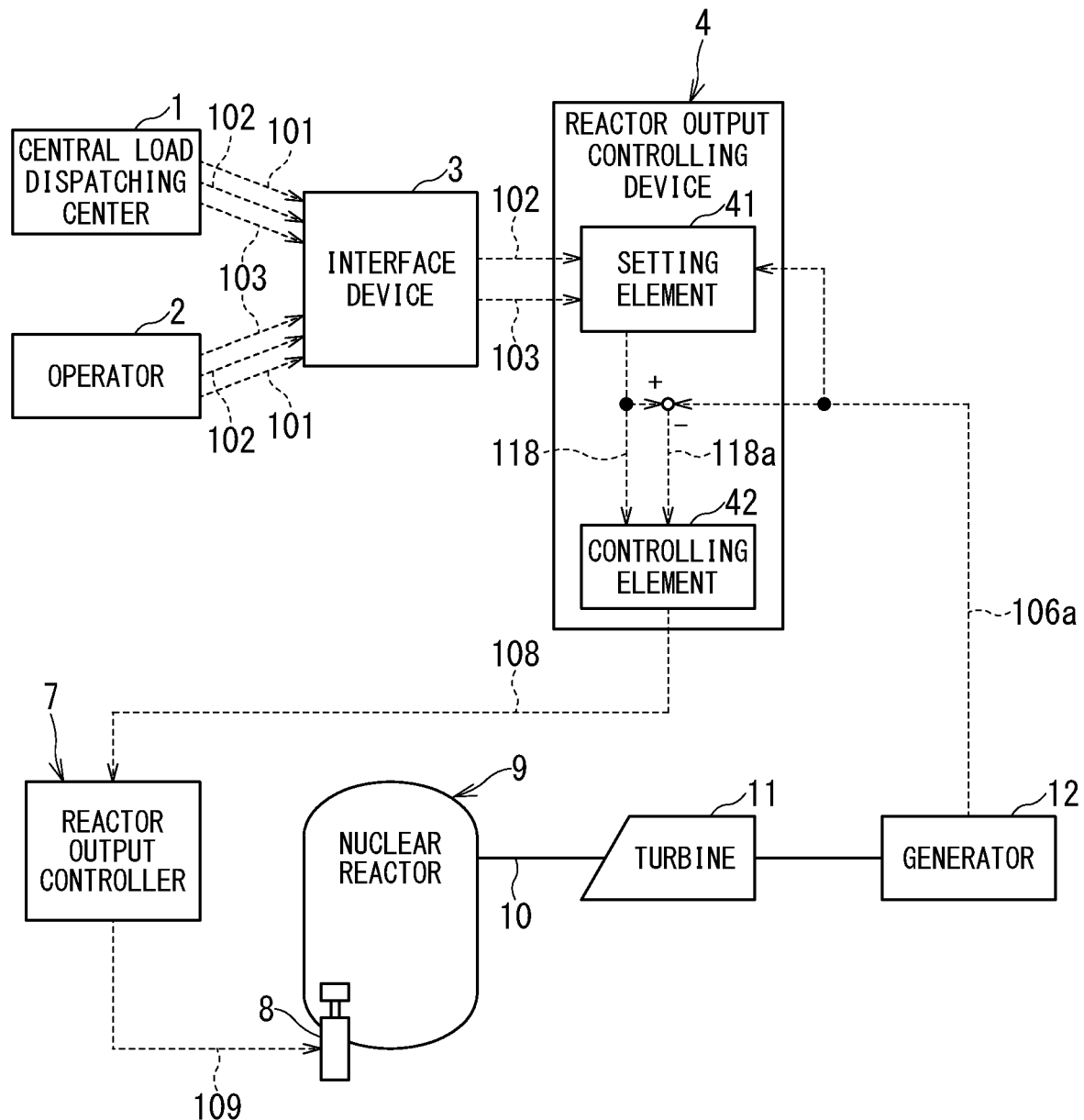
FIG. 8 is a configuration diagram illustrating a first configuration example of the conventional nuclear reactor power regulator.
Figure 9:
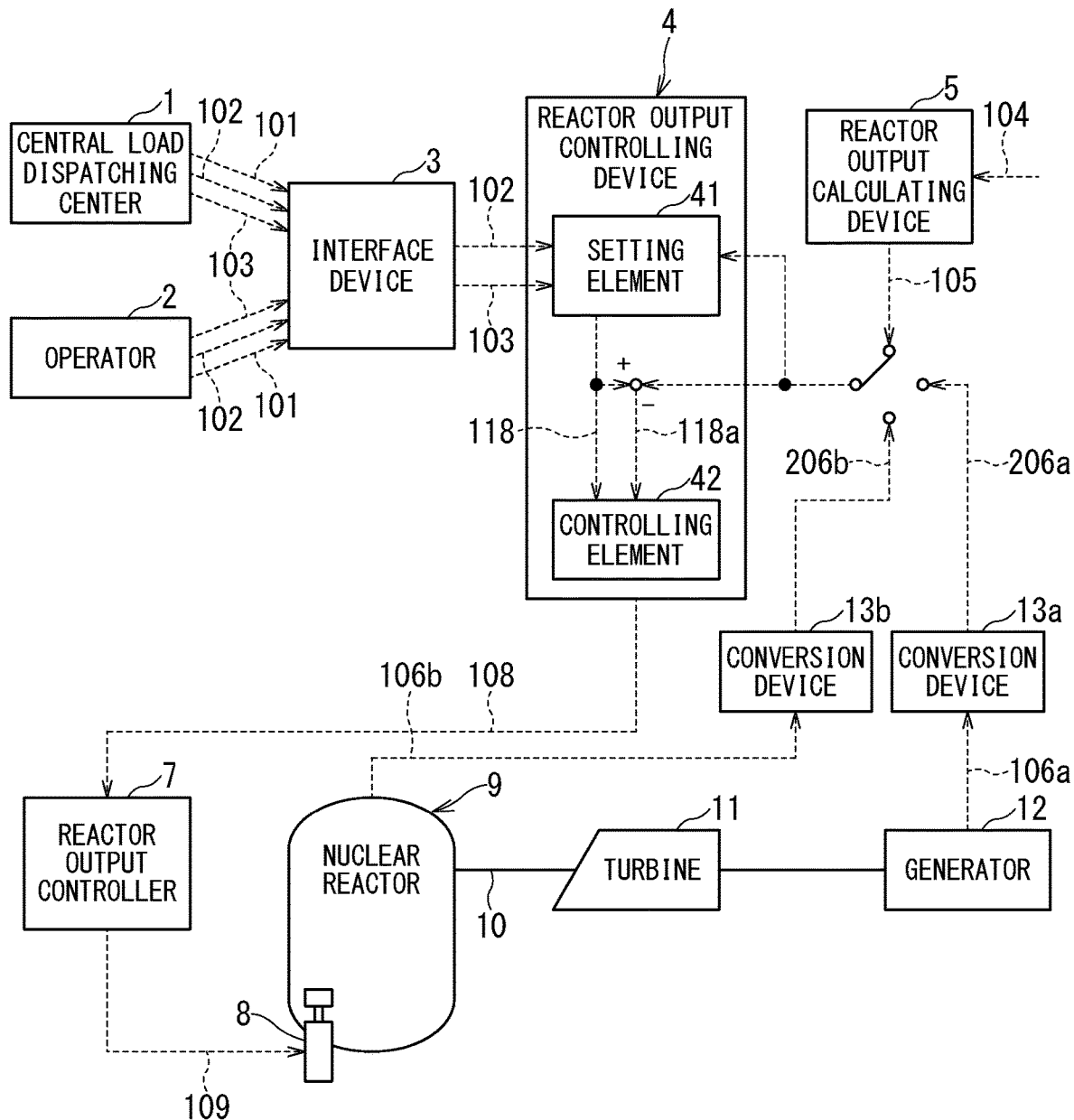
FIG. 9 is a configuration diagram illustrating a second configuration example of the conventional nuclear reactor power regulator.

Corresponding to FIG. 7

FIG. 7 is a configuration diagram illustrating a nuclear reactor power regulator 30D that is an example nuclear reactor power regulator according to a fifth embodiment of the present invention.

In describing the nuclear reactor power regulator 30D, the same configurations as those in the nuclear reactor power regulator 30 are denoted by the same reference numerals or characters, and redundant description thereof is omitted.

The nuclear reactor power regulator 30D is basically different in configuration from the nuclear reactor power regulator 30 in that the nuclear reactor power regulator 30D further includes: an automation on/off switching device 25 that switches an on/off state of the automation of the reactor power regulation, that is, makes switching between an automatic mode (on) in which the reactor power regulation is automatically performed and a manual mode (off) in which the reactor power regulation is manually (non-automatically) performed; and an automation cancellation signal generating device 26 that requests the switching device 25 to switch on or off the automation of the reactor power regulation.

The nuclear reactor power regulator 30D illustrated in FIG. 7 includes a plurality of the switching devices 25 (25a, 25b). The first switching device 25a disconnects the target value 102 and the change rate 103 from the reactor output controlling device 4. Since the nuclear reactor power regulator 30D includes the first switching device 25a, the nuclear reactor power regulator 30D enables a set value to follow the corrected equivalent signal 107 received from the correcting device 6, whereby the reactor output is maintained.

The second switching device 25b disconnects the signal 108 received from the reactor output controlling device 4 from the reactor output controller 7, as needed, for example, in a case where the corrected equivalent signal 107 is lost. Since the nuclear reactor power regulator 30D includes the second switching device 25b, the nuclear reactor power regulator 30D can prevent the reactor output control from being performed using an erroneous signal. Accordingly, during the reactor output control using the corrected equivalent signal 107, the nuclear reactor power regulator 30D can always cancel the automation of the reactor output control as needed, and can prevent unexpected reactor output control from being performed.

Further, if the nuclear reactor power regulator 30D further includes the automation cancellation signal generating device 26, the switching by the switching device 25 can be automated. The signal 105 or the corrected equivalent signal 107 is input to the automation cancellation signal generating device 26. Then, in a case where any of the two signals exceeds the rated reactor power by a given value or more, an automation cancellation signal 116 is transmitted to the switching device 25, and the automation of the reactor output control is cancelled.

In a case of using the nuclear reactor power regulating method described in any of the nuclear reactor power regulators (the nuclear reactor power regulators 30 to 30C) of the first embodiment to the fourth embodiment, it is considered that the reactor output cannot normally exceed the rated reactor power. However, if the reactor output exceeds the rated reactor power by a given value or more, the nuclear reactor power regulator 30D can automatically cancel the automated operation, and can thereby prevent the operation in a region beyond the rated reactor power. In another method, in a case where the reactor output control cannot be performed due to a malfunction of the reactor output controller 7, a reactor output controller malfunction signal 119 is input from the reactor output controller 7 to the automation cancellation signal generating device 26. Then, the automation cancellation signal generating device 26 generates the automation cancellation signal 116 and outputs to the switching device 25, whereby the automated operation may be cancelled.

In a case where the automation is cancelled, an automation cancellation information signal 117 is output to the interface device 3, whereby the cancellation is reported to the operator 2. Accordingly, the operator 2 can always monitor whether or not the reactor output control is automated (whether or not the automation is cancelled), on the display (monitor) of the interface device 3.

Although some embodiments of the present invention were described, these embodiments are in all respects illustrative and are not considered as the basis for restrictive interpretation. These new embodiments can be performed in other various forms, and various kinds of removals, replacements and modifications are possible without departing from the meaning of the present invention. These embodiments and their modifications are intended to be embraced in the range and meaning of the present invention, and are particularly intended to be embraced in the invention disclosed in the range of the claims and the equivalency thereof.

REFERENCE NUMERALS

1 - - - CENTRAL LOAD DISPATCHING CENTER
2 - - - OPERATOR
3 - - - INTERFACE DEVICE
4 (4a), 14 (4a, 4b) - - - REACTOR OUTPUT CONTROLLING DEVICE
5 - - - REACTOR OUTPUT CALCULATING DEVICE
6, 6a, 6b - - - CORRECTING DEVICE
7 - - - REACTOR OUTPUT CONTROLLER
7a - - - RECIRCULATION FLOW RATE CONTROLLING UNIT
8 - - - REACTOR OUTPUT CONTROLLING MACHINE
8a - - - REACTOR RECIRCULATION PUMP
9 - - - REACTOR
10 - - - MAIN STEAM PIPE
11 - - - TURBINE
12 - - - GENERATOR
13a, 13b - - - CONVERSION DEVICE
15 - - - REACTOR OUTPUT CONTROL SIGNAL SWITCHING DEVICE
16 - - - SIGNAL SWITCHING CONTROLLER
17 - - - REACTOR OUTPUT CHANGE RATE SUPPRESSION DEVICE
20 - - - REACTOR OUTPUT EQUIVALENT SIGNAL SWITCHING DEVICE
21 - - - SIGNAL SWITCHING CONTROLLER
22 - - - CORRECTED REACTOR OUTPUT EQUIVALENT SIGNAL SWITCHING DEVICE
25 (25a, 25b) - - - AUTOMATION ON/OFF SWITCHING DEVICE
26 - - - AUTOMATION CANCELLATION SIGNAL GENERATING DEVICE
30, 30A, 30B, 30C, 30D - - - REACTOR OUTPUT ADJUSTING APPARATUS
101 - - - OPERATION PATTERN
102 - - - REACTOR OUTPUT TARGET VALUE
103 - - - REACTOR OUTPUT CHANGE RATE
104 - - - PLANT STATE QUANTITIES (PARAMETERS)
105 - - - REACTOR OUTPUT SIGNAL
106 - - - REACTOR OUTPUT EQUIVALENT SIGNAL
106a - - - POWER GENERATOR OUTPUT SIGNAL
106b - - - IN-REACTOR NEUTRON FLUX SIGNAL
106c - - - TOTAL FLOW RATE DETECTION SIGNAL
107 - - - CORRECTED REACTOR OUTPUT EQUIVALENT SIGNAL
108 - - - REACTOR OUTPUT CONTROL SIGNAL
108a - - - FIRST REACTOR OUTPUT CONTROL SIGNAL
108b - - - SECOND REACTOR OUTPUT CONTROL SIGNAL
109 - - - REACTOR OUTPUT CONTROLLING EQUIPMENT ACTUATION REQUEST SIGNAL
110 - - - REACTOR OUTPUT CONTROL SIGNAL SWITCHING REQUEST SIGNAL
111 - - - REACTOR OUTPUT CONTROL SIGNAL SWITCHING SIGNAL
112 - - - REACTOR OUTPUT CHANGE RATE SUPPRESSION SIGNAL
113 - - - CORRECTED REACTOR OUTPUT EQUIVALENT SIGNAL BEFORE-AFTER-CORRECTION DEVIATION SIGNAL
114 - - - REACTOR OUTPUT EQUIVALENT SIGNAL/ CORRECTED REACTOR OUTPUT EQUIVALENT SIGNAL SWITCHING REQUEST SIGNAL
115 - - - REACTOR OUTPUT EQUIVALENT SIGNAL/ CORRECTED REACTOR OUTPUT EQUIVALENT SIGNAL SWITCHING SIGNAL
116 - - - AUTOMATION CANCELLATION SIGNAL
117 - - - AUTOMATION CANCELLATION ANNUNCIATION SIGNAL
118 - - - REACTOR OUTPUT SET VALUE
119 - - - REACTOR OUTPUT CONTROLLER MALFUNCTION SIGNAL

The invention claimed is:
1. A nuclear reactor power regulator that adjusts a power output of a reactor, comprising:
 an input to receive a reactor output target value and a reactor output change rate that are input by a central load dispatching center or an operator;
 a reactor output calculating device configured to perform computations based on a thermal equilibrium from power signals of plant parameters obtained from the reactor and to calculate a reactor output signal, the reactor output signal being a signal calculated intermittently;

a correcting device configured to receive the reactor output signal from the reactor output calculating device and a reactor output equivalent signal which is continuously obtained and correlated with the reactor output signal at a calculation interval in the reactor output calculating device, and that corrects the reactor output equivalent signal so that a reactor output level of the reactor output equivalent signal coincides with a reactor output level of the reactor output signal calculated by the reactor output calculating device based on the reactor output signal and thereby obtains a continuous corrected reactor output equivalent signal;

a reactor output controlling device configured to receive the continuous corrected reactor output equivalent signal and that calculates at least one reactor output control signal for controlling the output of the reactor, using the continuous corrected reactor output equivalent signal, the reactor output target value, and the reactor output change rate; and a reactor output controller configured to be operated based on the at least one reactor output control signal to control reactor power.

2. The reactor power regulator according to claim 1, wherein the correcting device is configured to calculate the continuous corrected reactor output equivalent signal, by multiplying the reactor output equivalent signal by gain that is corrected for each calculation interval in the reactor output calculating device.

3. The reactor power regulator according to claim 1, wherein the correcting device is configured to calculate the continuous corrected reactor output equivalent signal, by multiplying a difference between the reactor output equivalent signal and the reactor output signal calculated by the reactor output calculating device, by gain that is set in advance so that the reactor output level of the reactor output equivalent signal coincides with the reactor output level of the reactor output signal, by adding the obtained product to the reactor output signal, and by thus updating the reactor output signal at the calculation interval in the reactor output calculating device.

4. The reactor power regulator according to claim 1, wherein the correcting device calculates the continuous corrected reactor output equivalent signal, by multiplying a function that is set in advance so that the reactor output level of the reactor output equivalent signal coincides with the reactor output level of the reactor output signal calculated by the reactor output calculating device, by gain that is corrected for each calculation interval in the reactor output calculating device so that reactor output level of the reactor output equivalent signal coincides with the reactor output level of the reactor output signal during a plant operation.

5. The reactor power regulator according to claim 1, wherein the correcting device calculates the continuous corrected reactor output equivalent signal, by adding bias that is corrected for each calculation interval in the reactor output calculating device so that the reactor output level of the reactor output equivalent signal coincides with a reactor output signal during a plant operation, to a function that is set in advance so that reactor output level of the reactor output equivalent signal coincides with the reactor output level of the reactor output signal calculated by the reactor output calculating device.

6. The reactor power regulator according to claim 1, further comprising a reactor output control signal switching device that switches the at least one reactor output control signal used to control the reactor output signal between a first reactor output control signal calculated using the continuous corrected reactor output equivalent signal, the reactor output target value, and the reactor output change rate, and a second reactor output control signal calculated using a power generator output target value, a power generator output change rate, and a power generator output, wherein the at least one reactor output control signal includes the first and second reactor output control signals.

7. The reactor power regulator according to claim 6, further comprising a signal switching controller that requests, in accordance with the reactor output signal, a device to select any of the first reactor output control signal and the second reactor output control signal as the at least one reactor output control signal used to control the reactor.

8. The reactor power regulator according to claim 7, wherein the signal switching controller requests the reactor output control signal switching device to select the second reactor output control signal as the at least one reactor output control signal used to control the reactor in a case where the reactor output signal is less than a given value.

9. The reactor power regulator according to claim 7, wherein the signal switching controller requests the reactor output control signal switching device to select the first reactor output control signal as the at least one reactor output control signal used to control the reactor in a case where the reactor output signal is equal to or more than a given value.

10. The reactor power regulator according to claim 1, further comprising a change rate suppressing device that has a function of suppressing the reactor output change rate in a case of performing control using the reactor output equivalent signal corrected by the correcting device.

11. The reactor power regulator according to claim 10, wherein the change rate suppressing device has a function of switching an on/off state of the function of suppressing the reactor output change rate between an on state and an off state.

12. The reactor power regulator according to claim 10, wherein the change rate suppressing device is configured to generate a reactor output change rate suppression signal based on the continuous corrected reactor output equivalent signal, and output the generated reactor output change rate suppression signal to the reactor output controller.

13. The reactor power regulator according to claim 11, wherein the change rate suppressing device further has a function of automatically switching off the function of suppressing the reactor output change rate in any one of a case where the reactor output signal is less than a first given value and a case where a deviation between values before and after the correction of the continuous corrected reactor output equivalent signal is less than a second given value.

14. The reactor power regulator according to claim 11, wherein the change rate suppressing device further has a function of automatically switching on the function of suppressing the reactor output change rate in any one of a case where the reactor output signal is equal to or more than a first given value and a case where a deviation between values before and after the correction of the continuous corrected reactor output equivalent signal is equal to or more than a second given value.

15. The reactor power regulator according to claim 1, further comprising at least one of: a reactor output equivalent signal switching device that switchingly outputs one reactor output equivalent signal from among a plurality of the received reactor output equivalent signals as the reactor output equivalent signal; and a corrected reactor output equivalent signal switching device that switchingly outputs one continuous corrected reactor output equivalent signal from among a plurality of the corrected reactor output equivalent signals as the continuous corrected reactor output equivalent signal that are calculated by the correcting device according to respective different correction methods and are received from the correcting device.

16. The reactor power regulator according to claim 15, further comprising:
a first signal switching controller that, if the reactor power regulator comprises the reactor output equivalent signal switching device, controls the reactor output equivalent signal switching device to switchingly output a reactor output equivalent signal that makes a deviation smaller, from among the plurality of received reactor output equivalent signals; and
a second signal switching controller that, if the reactor power regulator comprises the corrected reactor output equivalent signal switching device, controls the corrected reactor output equivalent signal switching device to switchingly output a continuous corrected reactor output equivalent signal that makes the deviation smaller, from among the plurality of received continuous corrected reactor output equivalent signals,
wherein the first and second signal switching controllers are automatically actuated in a case where the reactor output signal is equal to or more than a first given value or is less than the first given value or where a deviation between values before and after the correction of the continuous corrected reactor output equivalent signal is equal to or more than a second given value.

17. The reactor power regulator according to claim 1, further comprising:
an automation on/off switching device that switches an on/off state of an automatic mode in which reactor power regulation is automatically performed; and
an automation cancellation signal generating device that generates an automation cancellation signal for switching to a manual mode in which the on/off state of the automatic mode is switched from on to off and the reactor power regulation is manually performed, in a case where the reactor output signal calculated by the reactor output calculating device or the continuous corrected reactor output equivalent signal exceeds a rated reactor power by a given value or more or where the reactor output controller breaks down,
wherein the automation on/off switching device automatically switches the on/off state of the automatic mode in accordance with whether or not the automation cancellation signal is received from the automation cancellation signal generating device.

* * * * *